Figure 1:
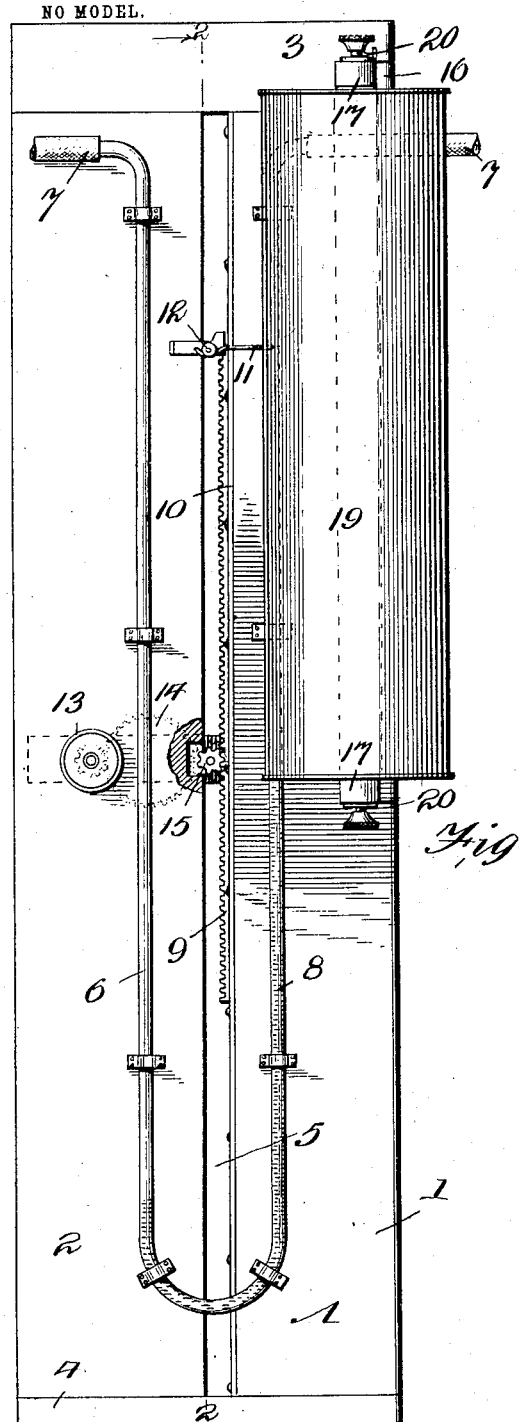

No. 736,583. PATENTED AUG. 18, 1903.
J. A. COLE.
RECORDING DEVICE.
APPLICATION FILED FEB. 3, 1903.
NO MODEL. 2 SHEETS—SHEET 1.

Witnesses:

Inventor:
John A. Cole.
by A. Miller Belfield
Attorney.

No. 736,583. PATENTED AUG. 18, 1903.
J. A. COLE.
RECORDING DEVICE.
APPLICATION FILED FEB. 3, 1903.
NO MODEL. 2 SHEETS—SHEET 2.
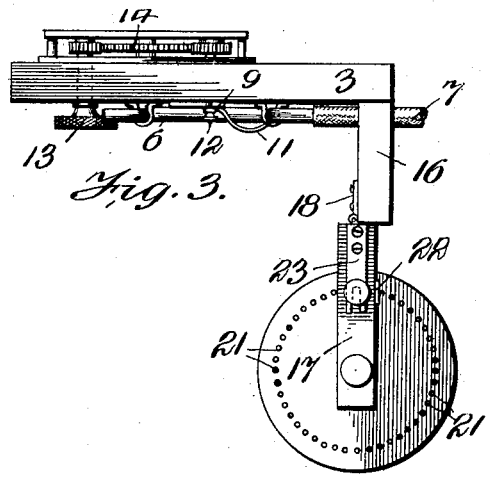
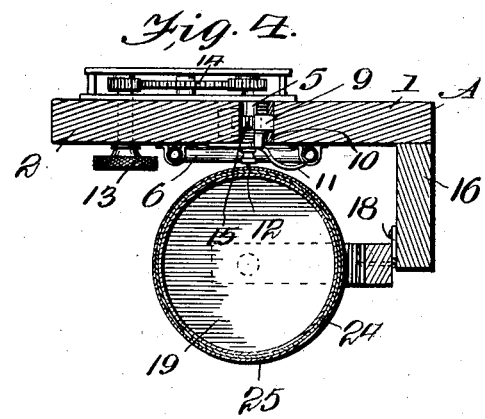
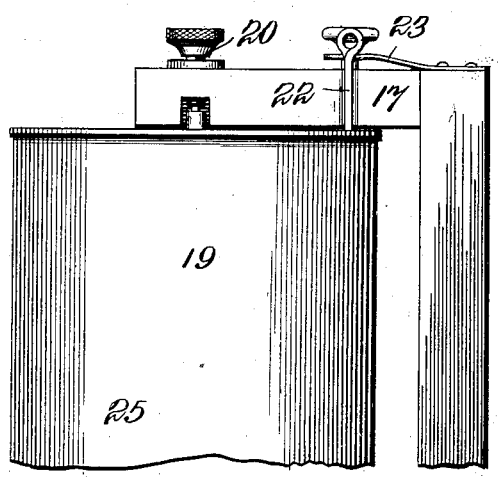
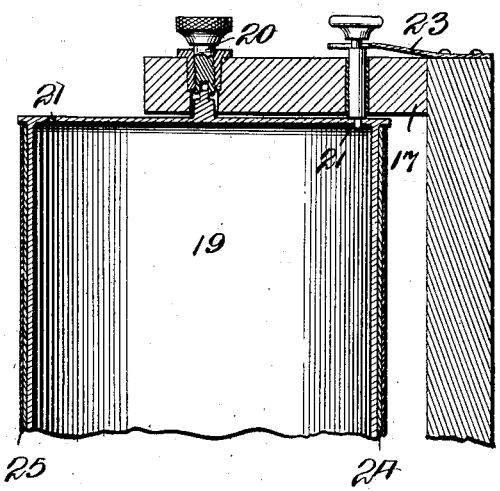
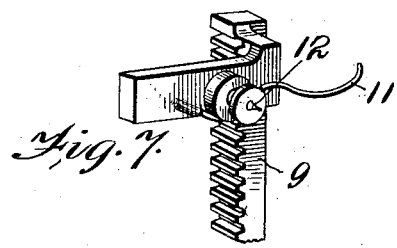
Witnesses:
Inventor:
John A. Cole.
by A. Miller Reynolds
Attorney.

No. 736,583. Patented August 18, 1903.

UNITED STATES PATENT OFFICE.

JOHN A. COLE, OF CHICAGO, ILLINOIS.

RECORDING DEVICE.

SPECIFICATION forming part of Letters Patent No. 736,583, dated August 18, 1903.

Application filed February 3, 1903. Serial No. 141,652. (No model.)

*To all whom it may concern:*

Be it known that I, JOHN A. COLE, a citizen of the United States, residing at Chicago, in the county of Cook and State of Illinois, have invented a certain new and useful Improvement in Recording Devices, of which the following is a full, clear, concise, and exact description, reference being had to the accompanying drawings, forming a part of this specification.

My invention relates to devices for recording the fluctuation of a liquid in a vertical tube.

The objects of my invention are to provide a practical and simple device of this kind; to make the same very inexpensive, so that it can be had and used with but very little expense; to make the same portable for convenience of handling; to arrange for ready and easy manipulation to secure a record, and to accomplish the above results in a simple, practical, and expeditious manner.

In the device shown for carrying out my invention I provide an indicating device conveniently in the form of a U-tube containing mercury or other liquid. I also provide an index or finger to take the indications of the indicating device—that is, to indicate the level of the mercury or other liquid in the U-tube. This index or pointer is made movable to allow its movement in accordance with the variations in the indications. I also provide in the device a suitable support or holder for a record conveniently in the form of a cylinder about which a record in the form of a paper can be arranged. This cylinder and the index are made relatively movable, so that one can be moved toward and away from the other to permit them to be brought into contact and then separated, and the index is provided with a pin or needle point by which an indication will be made upon the record when contact is brought about. The cylinder for the record is arranged for step-by-step rotary movement, so that it can be advanced to bring about new points of contact with the index pin-point. All of these devices are conveniently mounted in a simple and compact form and suitable devices arranged for the relative movements above mentioned. To manipulate the device, therefore, the index is moved so as to correspond to the level of the mercury in the U-tube, and then the record is brought into contact with such pin-point and a perforation or indentation made on the record. The record is then turned one step and the index brought to another indication of the mercury and contact made again, resulting in another perforation in the record. Successive indentations or perforations are thus made upon the record.

Figure 2:
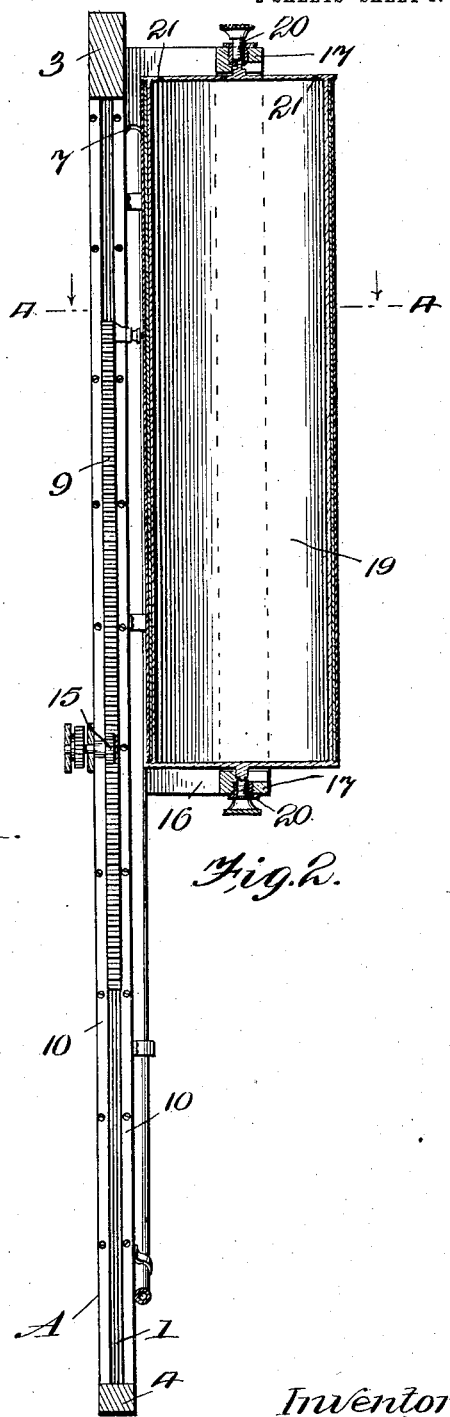

In the accompanying drawings, Figure 1 is a front view of a device embodying my invention. Fig. 2 is a section taken on line 2 2 in Fig. 1, with the recording-cylinder in a different position, however. Fig. 3 is a plan view looking down on the device in the position shown in Fig. 1. Fig. 4 is a section taken on line 4 4 in Fig. 2. Figs. 5 and 6 are views of the upper portion of the device, Fig. 6 being a sectional view; and Fig. 7 is a view of a detail of construction.

In the device shown in the drawings I provide a suitable board or support A, conveniently made of two parts or boards 1 and 2, with top and bottom connecting-pieces 3 and 4. The parts 1 and 2 are separated from one another, so as to leave a longitudinal space 5 between them. Upon this support A is mounted a large U-tube 6, and to the ends of this tube are connected flexible tubes or pipes 7 7. The tube 6 contains a column of mercury or other liquid 8. The tubes 7 7 are understood to run to any device causing the fluctuations. A sliding rack 9 is mounted upon the inner edge of the board 1, the latter being suitably provided with guide-strips 10 10 to serve as guides for the rack. The upper end of the rack 9 is provided with an index or pointer 11 and also with a pin-point 12. The finger or index 11 extends over to the right-hand side of the tube 6. A thumb-wheel 13 is mounted upon the board 2 and is connected by gears 14 and 15 with the rack 9, so that by turning the thumb-wheel 13 the rack 9, and therefore the pointer 11 and pin-point 12, will be shifted up and down.

A side board or support 16, Figs. 3 and 4, is secured to the board 1, and to this support 16 a frame 17 is pivotally connected, as by hinges 18 18. A recording-cylinder 19 is mounted in and carried by the frame 17, its upper and lower ends being conveniently mounted in adjustable bearings 20 20, so as to permit rotation of the cylinder and also to permit the proper adjustment of the same vertically. The top of the cylinder is provided with a series of apertures 21 21, Fig. 3, and the top brace of the frame 17 is provided with a catch 22, actuated by a spring 23. The cylinder 19 is understood to be provided with a suitable record—as, for instance, by arranging about the cylinder a layer 24 of blotting-paper or the like and then fastening the record 25 outside of the same.

The operation of the device is as follows: When the tubes 7 7 are properly connected with the device which causes fluctuations in the U-tube, the mercury or other liquid will be forced down one side—as, for instance, the left side of said tube—and up into the other side, as shown in Fig. 1. The thumb-wheel 13 is then turned to shift the sliding rack 9 so as to bring the index 11 opposite the top level of the mercury or other liquid. The recording-cylinder 19 is then swung in toward the index, so that the record is brought against the pin-point 12, as shown in Fig. 4. A perforation is thus made, and the recording-cylinder is then immediately swung back. The catch 22 is then lifted, so as to disengage the cylinder, and it is turned an extent to bring the next perforation 21 below the catch 22, when the latter is allowed to drop, and thus again lock the cylinder. The thumb-wheel 13 is again turned to bring the index 11 again opposite the level of the mercury, which, it is understood, has shifted slightly by reason of the variation in pressure, and then the cylinder 19 again swung so as to bring the record against the pin-point 12. Another indentation is thus made and the cylinder swung back. The record is again advanced, the index 11 adjusted to the top of the mercury, and another indentation is made. This is repeated time after time until the cylinder has been turned substantially a revolution, when a series of indentations indicating the variations in the pressure upon the liquid in the U-tube will have been made. From this series of indentations a curve may be plotted or results otherwise calculated. Any desired interval of time may be allowed to lapse between successive indentations on the record. The device may be operated as rapidly as possible to secure these indentations in rapid succession, or any chosen interval—as, for example, five minutes—may be allowed to elapse.

It will be seen that the device is simple and compact and can be made and sold very cheaply and at an expense very inconsiderable as compared with the high expense of other elaborate devices of this kind. It will also be seen that it can be easily handled by a person not skilled or familiar with the science to which it relates and can be easily and expeditiously transported from place to place.

It will be understood that variations and modifications can be made in the device without departing from the spirit of the invention and that the general features of the device can be used for other purposes.

What I claim as my invention is—

1. A device of the class specified, comprising an indicating device for indicating variations in the liquid flow, an index, means whereby the index can be shifted relatively to the indicating device to come into register with the indications thereof, a stylus associated with the index, a recording device, and means whereby the stylus and recording device can be brought together and separated to permit the former to act upon the latter when the two are together, substantially as described.

2. A device of the class specified, comprising a device for indicating variations in the liquid flow, an index, means whereby the index can be shifted relatively to the indicating device to come into register with the indications thereof, a stylus associated with the index, a recording device, and a swinging support on which the recording device is mounted, whereby such device can be swung toward and away from the stylus to cause the same to act upon the recording device, substantially as described.

3. A device of the class specified, comprising an indicating device consisting of a vertical tube containing a heavy liquid, an index, a shifting support carrying the index and arranged for movement along the tube to permit the index to come into register with the indications made by the heavy liquid therein, a stylus also carried by said shifting support, means for shifting said support, a recording device, and means whereby the stylus and recording device can be moved toward and away from one another to permit the former to act upon the latter when the same are brought together, substantially as described.

4. A device of the class specified, comprising an indicating device consisting of a vertical tube containing a heavy liquid, an index, a shifting support carrying the index and arranged for movement along the tube to permit the index to come into register with the indications made by the heavy liquid therein, a stylus also carried by said shifting support, a recording-cylinder, means for manually shifting said support, and means whereby the stylus and recording-cylinder can be shifted toward and away from one another to permit the former to act upon the latter when the same are brought together, substantially as described.

5. A device of the class specified, comprising an indicating device consisting of a vertical tube containing a heavy liquid, an index, a shifting support carrying the index and arranged for movement along the tube to permit the index to come into register with the indications made by the heavy liquid therein, a stylus also carried by said shifting support, a recording-cylinder, and a swinging support carrying the recording-cylinder and arranged to swing toward and away from the stylus to permit the same to act upon the material on the cylinder when it is brought in contact with the stylus, substantially as described.

6. The combination of an indicating device, consisting of a U-tube containing a heavy liquid, an index provided with a recording device, a slide arranged to shift lengthwise of the sides of said tube, said slide carrying said index and recording device, means for shifting the slide, and a cylinder mounted on a swinging support adapted to permit the cylinder to be swung toward and away from the recording device, substantially as described.

7. The combination of an indicating device, consisting of a U-tube containing a heavy liquid, a sliding rack arranged to slide lengthwise of the sides of said tube, an index, and a recording device carried by said rack, gearing for shifting the rack, and a swinging support carrying a recording-cylinder, said support being adapted to swing back and forth to permit a record on the cylinder to be brought against the recording device, substantially as described.

8. A device of the class specified, comprising a support A provided with a U-tube 6 containing a heavy liquid, a rack 9 arranged to slide lengthwise of the sides of the U-tube, an index 11 and a pin-point 12 carried by said rack, a thumb-wheel 13 and gears 14 and 15 for shifting said rack, a swinging frame 17 carrying a recording-cylinder 19, the frame being adapted to swing to permit the cylinder to be swung toward and away from the pin-point 12, and means for locking the cylinder in different adjustments, substantially as described.

9. The combination of an indicating device for indicating variations in liquid flow, of a stylus shiftable along said device so as to come opposite the indications thereof, a recording device on which the stylus can act, and means for shifting the stylus and recording device relatively to one another to permit the former to act upon the latter, substantially as described.

10. The combination of an indicating device for indicating variations in liquid flow, a stylus, means whereby the stylus can be shifted along the indicating device, so as to come opposite the indications thereof, and a recording device on which the stylus can act, substantially as described.

11. The combination of a vertical tube containing a heavy liquid, a stylus, means whereby the stylus can be shifted alongside of the tube to come opposite the indications of the heavy liquid therein, and a recording device on which the stylus can act, substantially as described.

12. The combination of a vertically-arranged U-tube containing heavy liquid, a stylus, a support shiftable along one of the sides of said U-tube and carrying the stylus, means for manually shifting said support to cause the stylus to register with the variations in the level of the heavy liquid in the U-tube, and a recording device on which the stylus can act, substantially as described.

In witness whereof I hereunto subscribe my name this 26th day of January, A. D. 1903.

JOHN A. COLE.

Witnesses:
A. MILLER BELFIELD,
I. C. LEE.